May 31, 1955  C. G. GERHOLD  2,709,641
EXTRACTION COLUMN
Filed Nov. 8, 1951
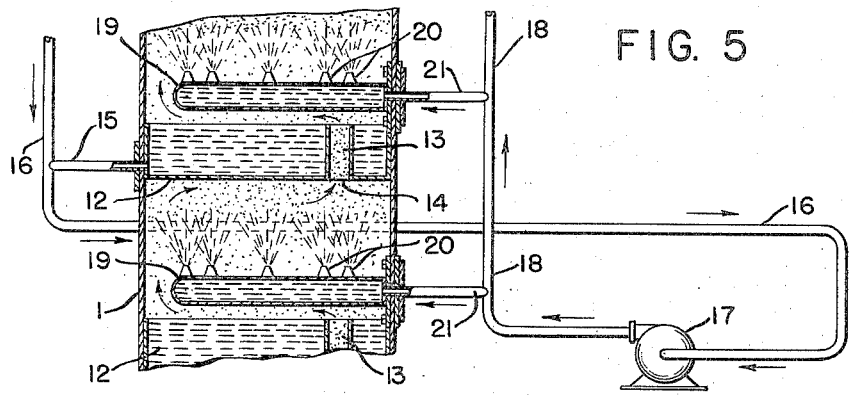
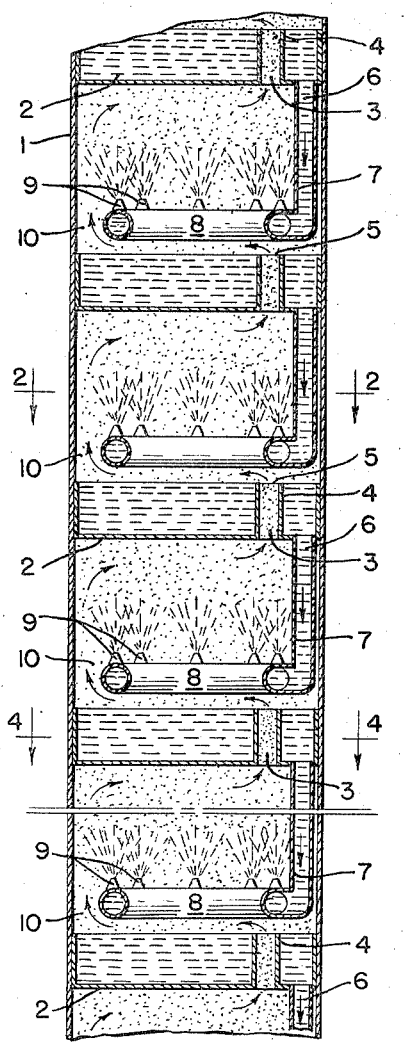
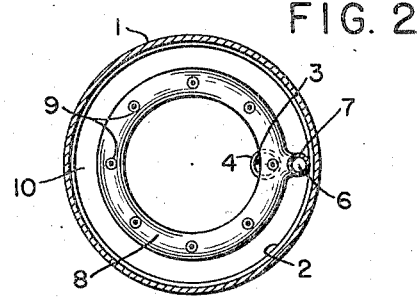
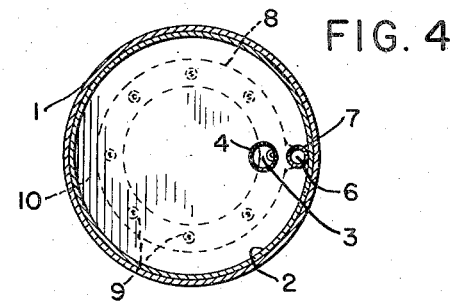
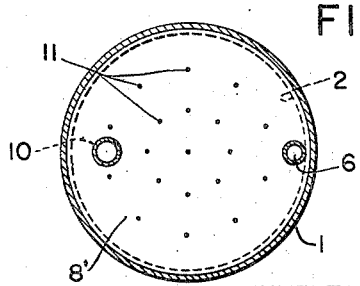
INVENTOR:
CLARENCE G. GERHOLD
BY: Chester J. Giuliani
Donald E. Moehling
ATTORNEYS:

United States Patent Office 2,709,641
Patented May 31, 1955

2,709,641

EXTRACTION COLUMN

Clarence G. Gerhold, Riverside, Ill., assignor to Universal Oil Products Company, Chicago, Ill., a corporation of Delaware Application November 8, 1951, Serial No. 255,440

3 Claims. (Cl. 23—270.5)

This invention relates to a countercurrent fluid-fluid extraction process and to an apparatus therefor. More specifically, the invention concerns a particularly efficient fluid-fluid countercurrent extraction process and an extraction column designed to obtain such efficient separation, said process involving a liquid solvent for at least one component of the fluid feed stock to be separated, and said column providing a means for collecting the fluid of greatest density present in the system on an overhead tray and spraying said fluid upwardly into the fluid of least density from a level below said overhead tray.

The transfer of a selectively dissolved component of a mixture of compounds into a solvent phase during countercurrent fluid-fluid extraction is dependent upon a number of factors mutually operating at the interface between the feed stock and the liquid solvent or extractant phase. One of the most important of these factors which determines the efficiency of the solvent-extractant, the purity of raffinate or its freedom from extract, and the quality or purity of the recovered product is the extent of interfacial area provided between solvent and feed stock phases, the latter factor directly determining the transfer rate of the selectively dissolved component from the feed stock to the solvent phase. Any suitable means which increases the effective interfacial area between the solvent and the feed stock mixture in general increases the efficiency of separation, the effectiveness of the solvent and the purity of the recovered raffinate and extract products. Other advantages which result indirectly from such increased interfacial area of contact include reduction in the number of theoretical plates required to attain a given degree of separation or a given level of product purity, as well as other benefits. One expedient for increasing the effective interfacial contact between the feed stock and solvent phases comprises increasing the distance one of the fluid phases must travel in contact with the other fluid in passing through the extraction column. The present invention provides an extraction process and a suitable apparatus therefor, in which the liquid phase of greater specific gravity is passed in a general downward direction through a countercurrent extraction column but in its general downward travel through the column it is alternately collected on a series of liquid retaining trays and sprayed or otherwise jetted upwardly through the fluid phase of lesser density. The sprayed liquid droplets thereby not only have a larger superficial area of contact with the fluid phase of lesser density by virtue of its fine state of subdivision when thus sprayed, but the time of contact between phases is further increased because the denser liquid phase is passed through the lighter fluid phase in its upward travel from the spray nozzle and again in its return downward travel by gravity settling to the collecting tray immediately below the spray nozzle.

It is thus one object of the present invention to increase the efficiency of a given selective solvent in a countercurrent extraction process to thereby either reduce the number of plates required to effect a given degree of separation and thus reduce the size of the extraction tower or increase the purity of the raffinate or the extract phase recovered from a given countercurrent extraction column of a given number of plates. Another object of the invention is to provide a countercurrent extraction column of specific design to obtain more efficient utilization of a selective solvent and to increase the degree of separation between raffinate and extract components of a given mixture of organic compounds containing extractable components.

In one of its embodiments, the present invention concerns an improvement in a countercurrent extraction process for separating at least one component of a fluid charging stock comprising a mixture of compounds which vary in their respective solubilities in a selective fluid solvent, wherein the fluid of greatest specific gravity selected from said fluid charging stock and said fluid solvent is a liquid which is introduced into the upper portion of a countercurrent extraction column and is directed to flow downwardly therein and the fluid of lesser specific gravity selected from said charging stock and said solvent is introduced into the lower portion of said column and directed to flow upwardly therein, said improvement comprising jetting said fluid of greatest specific gravity upwardly into said fluid of lesser specific gravity from a lower level in said column below the level at which said fluid of greater specific gravity is introduced into said column.

Another embodiment of the invention relates to a countercurrent extraction column providing improved interfacial fluid-liquid contact between a charging stock of mixed components and a selective solvent for at least one of said components which comprises in combination: a housing, a liquid collecting tray transversely disposed in said housing, an orifice in the bottom of said tray, a riser extending vertically from said orifice and providing a passageway therethrough for upward fluid flow, a liquid distributing means positioned in said housing below said liquid collecting tray and adapted to direct liquid upwardly in said housing in contact with a fluid phase of lesser density flowing upwardly in said column and a conduit connecting said collecting tray with said liquid distributing means for liquid flow therebetween.

Another embodiment of the invention concerns a countercurrent extraction column providing improved interfacial fluid-liquid contact between a fluid charging stock comprising a mixture of separable components and a selective solvent for at least one of said components, said column comprising in combination: a housing, a liquid collecting tray positioned in said housing, an orifice in said tray, a riser in said orfice, an upwardly projecting liquid spray nozzle below said tray and means for transferring liquid under pressure from said collecting tray to said spray nozzle.

Still another embodiment of the invention relates to a countercurrent extraction column providing improved interfacial fluid-liquid contact between a fluid charging stock comprising a mixture of separable components and a selective solvent for at least one of said components, said column comprising in combination: a housing, a liquid collecting tray positioned in said housing, an orifice in said tray, a riser attached in liquid seal relationship with said orifice, and a drainpipe extending downwardly from said tray and connecting at a lower level in said housing to an upwardly projecting spray nozzle.

The process and apparatus herein provided is particularly adaptable to the countercurrent extraction of a liquid charging stock comprising a mixture of separable components utilizing a liquid solvent which is selectively soluble with at least one of said components, although the method and operation may also be adapted to an extraction process involving a liquid solvent and a gaseous or vaporized charging stock or a liquid charging stock and a gaseous or vaporized solvent for at least one of the components of the charging stock. Thus, although adaptable and primarily useful for extracting a mixture of liquid components utilizing a liquid solvent extracting agent, the method and apparatus may broadly be utilized for extraction of any fluid charging stock employing a liquid solvent as extractant and may be adapted to extractive distillation in which the charging stock or selective solvent in a normally liquid condition is vaporized in a distillation zone attached to the extraction column and the resulting vapors are contacted with a liquid of greater specific gravity descending from the top of the extraction column to the distillation pot. It is a manifestly essential feature of the invention, as will be apparent from the description herein contained, that at least one of the phases present in the column must be liquid, that one of the phases must be of greater density or specific gravity than the other phase, and that the phase of greatest density or specific gravity must be charged into the column in the upper portion or at least above the point of introduction for the phase of lesser density or specific gravity. It is thus possible to vary the choice of selective solvents from those of greater to those of lesser density or specific gravity than the charging stock; furthermore, the solvent may be introduced into the process flow as a vapor or as a liquid and may be charged into the bottom or upper portion of the column, that is, below or above the point of charging stock introduction into the column.

Suitable charging stocks utilizable in the present system may be gaseous, liquid or vaporized liquid mixtures of different components which vary in their solubility in the solvent utilized in the process. The components of the charging stock may be essentially hydrocarbon, such as a mixture of paraffinic, olefinic, naphthenic and/or aromatic hydrocarbons in which one or more classes of hydrocarbons from the mixture are desirably separated from other class components in the mixture, such as aromatic and/or olefinic components from paraffinic and/or olefinic components, or merely organic mixtures containing a component having a more polar radical than the other components of the mixture, such as phenolic and/or sulfur-containing components which may be separated for example, from hydrocarbons, as in the case of sweetening a gasoline distillate; the separable component of the mixture may simply be the gum-forming impurities of a fuel oil petroleum distillate which are desirably removed from such fuel oil to produce a more economically valuable product. The process may also be operated for the recovery of aldehydes and/or ketones from an oxidized hydrocarbon mixture, such as the mixture formed by oxidizing hydrocarbons over a silver oxide catalyst, or for the removal of the oxidation products of an organic compound from an aqueous solution; the removal of inorganic salts from an aqueous solution with an organic compound of lesser specific gravity as extractant, as for example, in the recovery of stannic chloride from a dilute aqueous solution utilizing carbon disulfide as the extractant. Numerous instances in which the separation and recovery of organic and inorganic compounds from mixtures with other compounds and wherein the separable component is in an aqueous or a non-aqueous solvent may be cited, many of which may likewise be utilized as charging stocks in the present process and apparatus. One of the outstanding applications of the process and apparatus of this invention is the recovery of aromatic and/or sulfur compounds from a petroleum distillate, such as a hydroformed gasoline fraction utilizing a relatively more dense liquid extractant comprising an organic compound which is selectively miscible with the aromatic or sulfur components in the feed stock, including, for example, an aqueous solution of an oxypolyalkylene glycol, such as oxy-diethylene glycol or oxydipropylene glycol. The difference in specific gravities between the immiscible charging stock and liquid solvent phases present in such a system enables the respective phases to be readily separated and provides a highly effective spray when the dense liquid phase is jetted upwardly into the lighter phase present in the extraction column by virtue of the hydrostatic head of the denser liquid between the collecting tray and the spray nozzle positioned at a lower level in the column.

The choice of a suitable selective solvent for use in the present process and apparatus is dependent upon the class of compounds comprising the charging stock, and further, is selected on the basis of the above factors found to be essential prerequisites determining satisfactory operation of the process and in obtaining the countercurrent flow of liquid solvent in relation to the charging stock. In the type of operation in which the selective solvent or extractant comprises the phase of least density present in the extraction column, as in the case of extractive distillation processes in which the solvent is vaporized and contacted in its vapor state with a liquid charging stock, the solvent is ordinarily introduced into the extraction column in the bottom portion thereof and allowed to flow upwardly through the column, contacting the liquid charging stock which is usually introduced into the upper portion of the extraction column and allowed to flow downwardly in contact with the rising stream of solvent vapors passing upwardly through the column. Such considerations also obtain when a liquid solvent system is utilized and the solvent has a lower density or specific gravity than the charging stock introduced into the upper portion of the extraction column. In such instances, the solvent is generally an organic compound such as an oxygen-, nitrogen-, or sulfur-containing compound, which characterizes a large proportion of organic compounds commonly employed as suitable extractants for particular charging stocks. Typical representative oxygen-, nitrogen, and/or sulfur-containing compounds useful as solvents include the phenols, such as phenol itself, or a cresol; the alcohols, such as ethanol, methanol, propanol, etc.; the esters, such as methylacetate, ethylacetate, etc.; the ethers, such as diethylether, methylpropylether, dibutylether, etc.; the glycols, such as ethylene glycol, oxy-diethylene glycol, dioxy-triethylene glycol, glycerol, propylene glycol, oxydipropylene glycol, etc.; the ester ethers such as oxydiethylene glycol monoacetate; the ketones such as acetone, methylethylketone, diethylketone, etc.; the amines, such as diethylamine; the nitriles, such as acetonitrile, propionitrile, dipropionitrile, $\beta,\beta'$- oxydipropionitrile, $\beta,\beta'$-aminodipropionitrile, pyridine, quinoline, etc.; thiophene, $\beta,\beta'$-thio-dipropionitrile and numerous other solvents known in the prior art. Solvents of the above type may also be combined with water, ammonia, or other diluents which control the selectivity of the solvent for the particular class or a particular component of the charging stock subjected to extraction.

An alternative arrangement for operating the present process, particularly when the charging stock comprises a mixture of components of relatively low density or specific gravity relative to the solvent to be utilized in the process, or when the charging stock is a vaporized liquid, as in the case of an extractive distillation operation, the relatively more dense solvent phase is preferably introduced into the top of the column as a liquid and is allowed to flow in a generally downward direction in the column in contact with the rising mixture of charging stock components. An extraction system in which such a flow arrangement of the respective solvent and charging stock streams is commonly and advantageously employed is represented, for example, by the extraction of a petroleum fraction as charging stock for the recovery of the aromatic or olefinic hydrocarbon components thereof wherein a relatively more dense phase solvent, such as water or an aqueous solution of an alcohol, glycol or other organic solvent is utilized as extractant. It is to be understood, however, that the solvent phase need not necessarily in all instances constitute the phase of highest density or highest specific gravity but its point of introduction into the extraction column and the direction of flow therethrough is determined solely by its density relative to the feed stock utilized in the extraction process.

The present invention is further described with respect to specific embodiments, thereof, in regard to both process and apparatus modifications of the invention in the accompanying diagrammatic drawing, Figure 1 of which illustrates a sectional view of an extraction column of the present design containing multiple plates, Figure 2 of which represents the cross-section of the column along section line 2—2, presenting a top view of the liquid distributing means illustrated in Figure 1 at a level above the spray nozzles thereof, Figure 3 of which represents a cross-section of the extraction column from the top view of an alternative form of the liquid distributing means embodied in the present extraction column, Figure 4 of which represents one of the liquid collecting trays within the extraction column from a level above the bottom of said tray and Figure 5 of which represents an alternative modification of the liquid distributing portion of the apparatus, preferably a liquid spray-forming device, in which the relatively dense liquid is circulated to the spray nozzles under pressure by means of a circulating pump.

Referring to Figure 1 of the accompanying diagram, a multiple-plate countercurrent extraction column is illustrated which depicts an intermediate section of the column between the bottom and top thereof to indicate the novel features of the present invention. The countercurrent extraction column comprises in combination an external housing 1 of any desired shape, but preferably of substantially circular cross-section, and of vertically tubular design suitable for retaining liquids and/or gases therein and preferably fabricated of non-corrosive metal or ceramic construction materials. The interior of the column contains a series of substantially horizontally disposed liquid collecting trays which are attached to the inside surface of the tower in liquid seal relationship with the walls of the tower to prevent leakage of liquid from the collecting tray into lower portions of the extraction column other than through channels designed and adapted to permit the passage of liquids therethrough in accordance with the flow arrangement provided by the present apparatus. One of the trays, which are similar in design, is illustrated by tray 2 and contains an orifice 3 in the bottom thereof to permit passage of a light fluid charging stock or solvent from the bottom portion of the column into the upper portion thereof and ultimately through the raffinate phase outlet at the upper end of the column. Orifice 3 in liquid collecting tray 2 provides a vent for the light phase rising through the extraction tower and has a vertically projecting riser 4 inserted therein in liquid seal relationship so as to form a conduit through which the light fluid phase may rise into the upper portions of the extraction column. The upper end of the vertically projecting riser pipe 4 is also a vent orifice 5 for the upwardly flowing light fluid phase as well as a raiser for the downwardly flowing dense liquid phase. The pipe conduit 4 between the upper and lower orifices in the riser thus defines a liquid retaining wall for maintaining the height of the liquid on the collecting tray at a maximum level determined by the height of the riser pipe 4 and when the latter level is exceeded, and the dense liquid phase tends to flow over the weir 5 provided by the upper end of the riser pipe onto a lower collecting tray, although the liquid distributing means immediately below the collecting tray generally allows sufficient flow therethrough to accommodate the entire body of liquid accumulating on the collecting tray above.

Collecting tray 2 also contains a second orifice 6 in the bottom of the tray connected in liquid seal relationship to downspout 7 comprising a conduit for directing the liquid accumulating on collecting tray 2 to a lower level in the column, thus building up a hydrostatic head of liquid which increases as the level of liquid accumulating on liquid retaining tray 2 and the length of conduit 7 increases. Liquid conduit 7 connects at its lower end and at a lower level in a column 1 to a liquid distributing means such as a spray head comprising at least one spray nozzle projecting upwardly in the extraction column. Other means suitable for jetting the liquid collecting on tray 2 under the hydrostatic head resulting from accumulation of liquid on tray 2 and in downspout 7 may be utilized, including simply an upturned spout. Alternatively, the spray may be formed by a series of multiple upwardly projecting spouts, such as 9, arranged in annular alignment, as for example, on the upper surface of a ring conduit 8. The liquid distributing means provided by ring 8 provides a circular spray and a space in the center of the ring for undisturbed flow of upwardly flowing fluid. This arrangement permits a portion of the fluid to by-pass some of the spray nozzles as a result of the fluid rising in a straight vertical line from a spray nozzle at a lower level in the column through the vent provided by the orifice in the bottom of the collecting tray above the spray nozzle, an arrangement which may be particularly desirable for accommodating a large flow of charging stock or solvent through the tower, but which results in less than optimum efficiency of operation. It is generally preferable, however, to direct the upflowing fluid transversely across the column between succeeding collecting trays, thereby obtaining maximum contact between the up-flowing feed stock and downwardly flowing fluid solvent or vice versa and maximum efficiency of separation. A suitable means for obtaining the desired cross-flow of countercurrent fluids through multiple liquid collecting trays and liquid distributing means arranged alternately and spaced vertically within the housing 1 comprises providing an up-flowing fluid vent in the liquid distributing means on one side of the column and positioning the orifice in the liquid collecting tray (the vent for the up-flowing fluid) on the opposite side of the housing. A suitable arrangement for this purpose is illustrated in the accompanying diagram, comprising a tray extending horizontally across the column and having no orifice or vent therein for the up-flowing fluid phase other than an orifice on the side of the column opposite the up-flowing fluid orifice in the liquid collecting tray immediately above the liquid distributing means, as for example, in the position occupied by up-flowing fluid vent 10 in Figure 1 of the accompanying diagram. A horizontal plate of this type is illustrated in Figure 3 depicting the view from above the plate along section line 2—2, and is represented by a hollow enclosure containing multiple upwardly projecting spray nozzles on the upper surface of the tray, such as 11, an opening for the downwardly projecting drainpipe 6, which conducts the downwardly flowing fluid into the hollow plate, and the conduit 10 extending through both surfaces of the hollow plate in liquid seal relationship with the down-flowing dense fluid within the hollow tray 8'. The latter hollow tray acting as an alternative form of the liquid distributing means is fixed to the inner wall of the tubular extraction column, also in liquid seal relationship therewith and has an upper perforated surface for producing an upwardly projecting fluid jet which directs the dense fluid spray initially upward through the light fluid phase, the sprayed droplets thereafter descending by gravity through the fluid to contact the latter again in their downward descent through the light fluid. Thus, although the dense fluid leaves the liquid distributing means in an upward direction, its general direction of flow is downward and the fluid eventually leaves the bottom of the column through a drainpipe from the lowermost collecting tray in the column. The lower surface of the hollow plate 8' is continuous and without perforations, except for the upflowing fluid vent 10 extending through the hollow tray to the upper surface thereof.

Figure 2 illustrates an alternative form of the liquid distributing means 8, comprising a hollow ring attached in fluid seal and fluid communicating relationship with the downwardly extending liquid drainpipe 6. Liquid distributing means 8 also contains upwardly projecting spray nozzle 9, preferably a large number of such nozzles on the upper surface of the ring, as viewed from section 2—2, to provide a series of upwardly projecting liquid jets.

Figure 4 depicts a downward view of the liquid collecting tray across the horizontal section line 4—4 and illustrates a continuous sheet or tray fixed in fluid seal relationship to the inner surface of the tubular column 1. Liquid collecting tray 2 when viewed from above the section line 4—4 contains an orifice 3 in which upwardly projecting riser 4 is attached in liquid seal relationship to prevent the escape of liquid from the collecting tray. The tray also contains a second orifice 6 attached in liquid seal relationship to downwardly extending drainpipe 7 which conducts the liquid collecting on tray 2 downwardly to liquid distributing means 8 at a lower level sufficiently below the collecting tray to impart the desired hydrostatic head to the liquid and produce a spray of required velocity through the spray nozzles such as 9.

An alternative apparatus for jetting or spraying the relatively dense liquid phase into the upwardly flowing fluid phase is illustrated in Figure 5 which depicts a section of an extraction tower in which the dense phase fluid is sprayed upwardly into the up-flowing light phase fluid under pressure produced mechanically by means of a pump. The down-flowing liquid dense phase collects on horizontal trays, such as 12, vertically spaced in housing 1, preferably a tubular shell. The liquid collecting tray contains a riser 13, inserted in liquid seal relationship into orifice 14 in the bottom of tray 12, the riser tube raising the level of the liquid collecting on tray 12 to the height of the tube. A conduit or pipe 15 opening into the pool of liquid collecting on tray 12 connects with intake manifold pipe 16 leading to the intake port on pump 17, desirably a centrifugal pump, although any suitable pump adapted to transfer liquids under pressure may likewise be utilized. The liquid dense phase is thereby forced under sufficient pressure into outlet manifold pipe 18 which transfers the liquid to a series of conduits connecting with the vertically spaced liquid distributing means such as spray head 19 containing nozzles 20. The spray heads and liquid collecting trays are arranged alternately in the extraction column spaced with sufficient distance between the spray nozzles 20 and the tray 12 to obtain the desired degree of countercurrent contact between the two fluid phases. The distributing means 19 is preferably placed substantially horizontally in the column. A pipe, such as 21, connects the outlet manifold 18 of pump 17 with each of the liquid distributing means, such as 19. Although the individual spray heads 19 may be supplied with the dense liquid phase under pressure through a common manifold, as illustrated, it may be preferable to provide separate conduits leading from each spray head to a pump 17 or to provide individual pumps for each spray head, thereby maintaining the pressure on each spray head at a constant value, as desired, and maintaining the flow of both the extractant and feed stock truly countercurrent.

The liquid distributing means illustrated in the accompanying diagram, comprising spray nozzles projecting upwardly in the housing which thereby direct the spray substantially vertically in the direction of flow of the light fluid phase, constitutes merely one, although the preferred member of a number of suitable devices to effect this purpose; other specific variations, including jet nozzles, atomizing nozzles, etc. are likewise utilizable and may, in fact, be considered mere variations of the general class characterized as spray nozzles. The nozzle may be of the hollow cone type, including both the tangential and fixed spiral types, a solid cone type, a fan nozzle, the design type known as an impact nozzle, a rotating nozzle, or other common types known in this art.

The present invention is further illustrated with respect to specific embodiments thereof in the following example, which, however, are not to be construed as limiting the scope of the invention in strict accordance therewith.

An extraction tower of the general design herein provided is utilized to extract aromatic hydrocarbons from a petroleum distillate fraction boiling from 40° to 115° C. and containing benzene, toluene and a small amount of xylenes (a total aromatic content of about 24% by weight) in admixture with paraffins, olefins and napthenes. The extractant is an aqueous oxydiethylene glycol solution containing about 15% by weight of water which is introduced into the extraction column under pressure through a series of vertically spaced spray heads alternating with horizontal collecting trays above each spray head. The liquid extractant accumulating in each of the collecting trays drains into receiver vessels for each tray through pipe conduits containing one-way flow valves and the liquid extracts thus accumlating in the receiver vessels are transferred under 20 lbs./in.$^2$ to the spray head immediately below the receiver vessels from which the extract phase is recovered, the latter arrangement providing true countercurrent flow of both the extractant and the liquid hydrocarbon phases. The hydrocarbon stream is introduced into the bottom of the extraction column at a temperature of 25° C. and at a rate of 30 gallons per hour while fresh aqueous oxydiethylene glycol (also at 25° C.) is pumped into the top collecting tray at a rate of 90 gallons per hour. The raffinate hydrocarbon stream removed from the top of the column contains less than 0.5% aromatic hydrocarbons and distillation of the recovered extract phase removed from the bottom collecting tray in the column yields seven gallons per hour of mixed benzene, toluene and xylene. The column operates with ten spray heads and eleven collecting trays, the column being approximately twelve feet in height. In an extraction column of the same exterior dimensions and packed with berl saddles the recovery of aromatic stock from a similar hydrocarbon feed is 4.3 gallons per hour and in a bubble deck column of similar dimensions, the recovery of aromatics is 4.7 gallons per hour.

I claim as my invention:

1. In a countercurrent extraction column, the combination of a pair of vertically spaced trays extending across the column, means for collecting a pool of liquid on the upper tray, an orifice in the bottom of the lower tray, an open-ended tubular riser extending upwardly from said orifice and terminating a substantial distance below said upper tray, an annular liquid distributing conduit disposed above said riser and below said upper tray, upwardly directed spray nozzles spaced horizontally around said annular conduit, and means for supplying liquid from said upper tray to said conduit and nozzles.

2. In a countercurrent extraction column, the combination of a pair of vertically spaced trays extending across the column, means for collecting a pool of liquid on the upper tray, an orifice in the bottom of the lower tray, an open-ended tubular riser extending upwardly from said orifice and terminating a substantial distance below said upper tray, an annular liquid distributing conduit disposed above said riser and below said upper tray, upwardly directed spray nozzles spaced horizontally around said annular conduit, an orifice in the bottom of said upper tray and a drainpipe extending downwardly in the column from the last-named orifice to said annular distributing conduit for supplying liquid from the upper tray to said conduit and nozzles.

3. An apparatus as defined in claim 2 further characterized in that the extraction column is provided with a multiple and alternating arrangement of said trays and distributing conduits, there being a drainpipe connecting each tray with the distributing conduit therebelow.

References Cited in the file of this patent

UNITED STATES PATENTS

| | | |
|---|---|---|
| 2,009,347 | Sheldon | July 23, 1935 |
| 2,082,034 | Smith | June 1, 1937 |
| 2,091,645 | McConnell | Aug. 31, 1937 |
| 2,191,919 | Thayer | Feb. 27, 1940 |
| 2,228,434 | Belden | Jan. 14, 1941 |
| 2,361,780 | Lewis | Oct. 31, 1944 |
| 2,451,433 | Davis | Oct. 12, 1948 |
| 2,458,170 | Ittner | Jan. 4, 1949 |
| 2,623,813 | Strong | Dec. 30, 1952 |